United States Patent
Shiokawa et al.

(10) Patent No.: US 8,662,224 B2
(45) Date of Patent: Mar. 4, 2014

(54) ARRANGEMENT OF ELECTRIC PART (75) Inventors: Tatsuya Shiokawa, Wako (JP); Masatoshi Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 491 days.

(21) Appl. No.: 12/708,571

(22) Filed: Feb. 19, 2010

(65) Prior Publication Data

US 2010/0224433 A1 Sep. 9, 2010

(30) Foreign Application Priority Data

Mar. 5, 2009 (JP) ................................. 2009-051795

(51) Int. Cl.
*B60K 26/00* (2006.01)

(52) U.S. Cl.
USPC ........................ 180/68.3; 180/291; 123/195 E (58) Field of Classification Search
USPC .............. 180/68.3, 68.4, 68.5, 291, 311, 312; 123/195 E, 195 A
See application file for complete search history.

(56) References Cited

U.S. PATENT DOCUMENTS

| | | | | |
|---|---|---|---|---|
| 5,117,932 A * | 6/1992 | Kurosu et al. | ................ | 180/68.2 |
| 7,185,624 B1 * | 3/2007 | Konagai et al. | ........... | 123/195 E |
| 7,216,733 B2 * | 5/2007 | Iwami et al. | ................ | 180/68.1 |
| 7,232,171 B2 * | 6/2007 | Lan et al. | ...................... | 296/37.1 |
| 7,311,170 B2 * | 12/2007 | Isoda et al. | ................... | 180/296 |
| 7,374,009 B2 * | 5/2008 | Yamamoto et al. | ........... | 180/291 |
| 7,562,736 B2 * | 7/2009 | Eguchi et al. | ................ | 180/291 |
| 7,730,986 B2 * | 6/2010 | Takeshima et al. | .......... | 180/68.5 |
| 8,047,324 B2 * | 11/2011 | Yao et al. | ...................... | 180/296 |
| 8,196,689 B2 * | 6/2012 | Hosoda | ........................ | 180/68.4 |
| 8,413,758 B2 * | 4/2013 | Shiina et al. | .................. | 180/311 |
| 8,439,148 B2 * | 5/2013 | Shiina et al. | .................. | 180/312 |
| 8,453,780 B2 * | 6/2013 | Yamamoto et al. | ........... | 180/219 |
| 2007/0075845 A1 * | 4/2007 | Kawamura et al. | ........ | 340/425.5 |

FOREIGN PATENT DOCUMENTS

JP 3897969 1/2007

* cited by examiner

*Primary Examiner* — Katy M Ebner
*Assistant Examiner* — Emma K Frick
(74) *Attorney, Agent, or Firm* — Squire Sanders (US) LLP (57) ABSTRACT

A saddle-ride type vehicle, and arrangement of an electric part such as a controller for a saddle-ride type vehicle, can include a vehicle frame which has a left main frame and a right main frame which extend from a forward side to a rearward side of a vehicle body. An engine is supported on the vehicle frame, and a throttle body is disposed near the engine. An air cleaner is disposed adjacent throttle body, and a controller is provided, which is configured to control the engine. A support member supports at least a controller, with the support member being removably mounted relative to the vehicle body. The support member is separate from the throttle body and the air cleaner. The support member is typically disposed above the throttle body.

18 Claims, 8 Drawing Sheets

ARRANGEMENT OF ELECTRIC PART

BACKGROUND

1. Field

The present invention relates to an arrangement of an electric part including an ECU performing, for example, engine control.

2. Description of the Related Art

An ordinary motorcycle running on, for example, a paved road, or a four-wheel buggy, a type of ATVs (all terrain vehicles) running on, for example, a rough road or a so-called saddle-riding type vehicle is mounted with an electric part including an ECU (the engine control unit, also known as the electronic control unit) that serves as a control unit. The ECU is a relatively large electric part requiring an appreciable mounting space. It is therefore common practice to dispose the ECU in a suitable empty space of a vehicle body.

An ATV vehicle as disclosed in Patent Document 1 (Japanese Patent No. 3897969) has the ECU fixed on an upper surface of a storage box disposed near a tail light. The ATV vehicle thereby acquires a mounting space for the ECU, while at the same time allowing the ECU to be protected from, for example, rocks or gravel thrown by a wheel.

SUMMARY

Generally, a large-sized electric part, such as the ECU, is disposed forwardly or rearwardly in the vehicle, where the mounting space can be relatively easily obtained as in the above-cited known art.

Components such as a sensor disposed ahead of a harness connected to the ECU, however, tend to be concentrated in an area near a throttle body disposed near an engine. Considering the length of the harness between the ECU and each component, it is desirable that the ECU be disposed near the throttle body.

The throttle body, an air cleaner and other intake system parts, or auxiliaries are, however, concentrated in the area near the engine, which makes it difficult to obtain the mounting space for the ECU. A main frame, an exhaust pipe, or a vehicle body cover disposed sideways of the vehicle body in vehicles such as the abovementioned ATV fairly limits a path for accessing the throttle body when, for example, servicing the throttle body. When disposing the ECU near the throttle body, therefore, there is a need for considering the access path to the throttle body.

The present invention has been made in conjunction with such a known art as above and it is an object of the present invention to provide an arrangement of an electric part that allows the electric part including the ECU to be disposed at any location, while ensuring maintainability of the throttle body.

According to an embodiment of the present invention, there is provided a saddle-ride type vehicle, and an arrangement of an electric part for a saddle-riding type vehicle. The vehicle can include a pair of left and right main frames extending from a forward side to a rearward side of a vehicle body. An engine is supported on the vehicle body frame, and a throttle body is disposed near the engine. An air cleaner can be disposed rearwardly of the throttle body, and a controller, such as an ECU, controls the engine. The arrangement can include a support member supporting an electric part including at least the ECU. The support member can be removably mounted relative to a vehicle body and formed separately from the throttle body and the air cleaner. The support member is disposed upwardly of and near the throttle body.

According to another embodiment of the present invention, the support member is removable relative to the vehicle body by being fitted relative to a fit portion formed on a side of the vehicle body.

According to another embodiment of the present invention, the vehicle can further include a fuel tank supported between the pair of left and right main frames and a seat for an occupant disposed rearwardly of the fuel tank. Herein, the support member is disposed rearwardly of the fuel tank and downwardly of the seat and surrounded by the fuel tank and the seat.

According to another embodiment of the present invention, the vehicle further includes side covers disposed on either lateral side of the vehicle body, the side covers covering areas from side portions of the fuel tank to a front portion downward of the seat. Herein, the support member is removably mounted relative to the vehicle body with the side covers and the seat removed.

According to another embodiment of the present invention, the vehicle further includes rear fenders disposed on either lateral side of the vehicle body, the rear fenders covering from an area downward of the seat to a rearward side of the vehicle body. Herein, the support member is disposed across the left and right rear fenders.

According to yet another embodiment of the present invention, the support member is disposed across the left and right main frames.

According to yet another embodiment of the present invention, a first harness extending from the electric part supported on the support member is connected in a condition of being locked by lock means disposed on the support member to a second harness fixed to the main frames and the support member is movable about a connection between the first harness and the second harness as a pivot.

According to yet another embodiment of the present invention, the first harness can be routed toward one side of the vehicle body before being connected to the second harness.

According to certain embodiment of a saddle-riding type vehicle, the electric part including, for example, the controller is supported by the support member formed separately from the throttle body and the air cleaner, and the support member is removable relative to the vehicle body and disposed upwardly of the throttle body that requires a predetermined service job. Space utilization can thereby be promoted by disposing the controller upwardly of the throttle body where, in general, no parts could conventionally be disposed for the requirement of a space for servicing the throttle body. In addition, the controller can be disposed close to the throttle body upwardly thereof, so that harnesses connecting the controller and sensors can be kept to a minimally required length. Moreover, the controller together with the support member can be easily removed from the vehicle body for servicing of the throttle body, which achieves sufficient maintainability of the throttle body. There is also no need to perform such work as connecting the harnesses to the controller before and after the service job, so that the harnesses can be brought back to their original positions with ease. Specifically, use of the support member allows the electric part including the controller to be disposed easily at a position upward of and close to the throttle body, where a number of sensors and other parts are connected to the ECU and service jobs are required including, for example, replacement of a throttle cable.

According to another, the support member can be mounted on the vehicle body side without using a bolt or other fastening member. This permits even easier removal and reinstallation work of the support member.

According to another embodiment of the present invention, the controller can be disposed via the support member in the space for servicing the throttle body formed between the rear of the fuel tank and the seat, which permits effective and efficient space utilization. Moreover, the controller is disposed at a position surrounded by the fuel tank and the seat, which effectively reduces extraneous influence, such as muddy water, on the controller.

According to another embodiment, the support member is removably mounted relative to the vehicle body with the side covers and the seat removed. This facilitates removal and reinstallation of the controller.

According to yet another embodiment, the support member is disposed across the left and right rear fenders. The support member can therefore be made to function as a reinforcement member connecting the left and right rear fenders.

According to another embodiment, the support member is disposed across the left and right main frames. This allows the electric part to be disposed near the center of vehicle width, achieving good lateral weight balance of the vehicle.

According to another embodiment, the first harness extending from the electric part is connected to the second harness fixed to the main frames in a condition of being locked by the lock means disposed on the support member and the support member is movable about the connection between the first harness and the second harness as a pivot. This allows the support member to be moved about the connection as a pivot using the first harness as a hinge when the support member needs to be removed for servicing the throttle body, so that the support member and the controller can be cleared away for servicing. Further, there is no need to remove the first harness from the controller when the support member is to be removed from the vehicle body. This facilitates routing of the harness before and after the servicing and eliminates the need for connecting the harness. In addition, the first harness, being locked on the support member side with the lock means, effectively prevents the connection terminals of the controller and other electric parts from being directly loaded when the support member is moved.

According to another embodiment of the present invention, the first harness is routed toward one side of the vehicle body before being connected to the second harness. This allows the support member to be moved toward one side of the vehicle, thereby obtaining a wide work space upwardly of the throttle body. Additionally, the harnesses, being concentrated on one side, can be easily routed.

DESCRIPTION OF EMBODIMENTS

An arrangement of an electric part according to certain embodiments of the present invention will be described below in detail with respect to an ATV as a saddle-riding type vehicle to which the arrangement is applied and with reference to the accompanying drawings.

Figure 1:
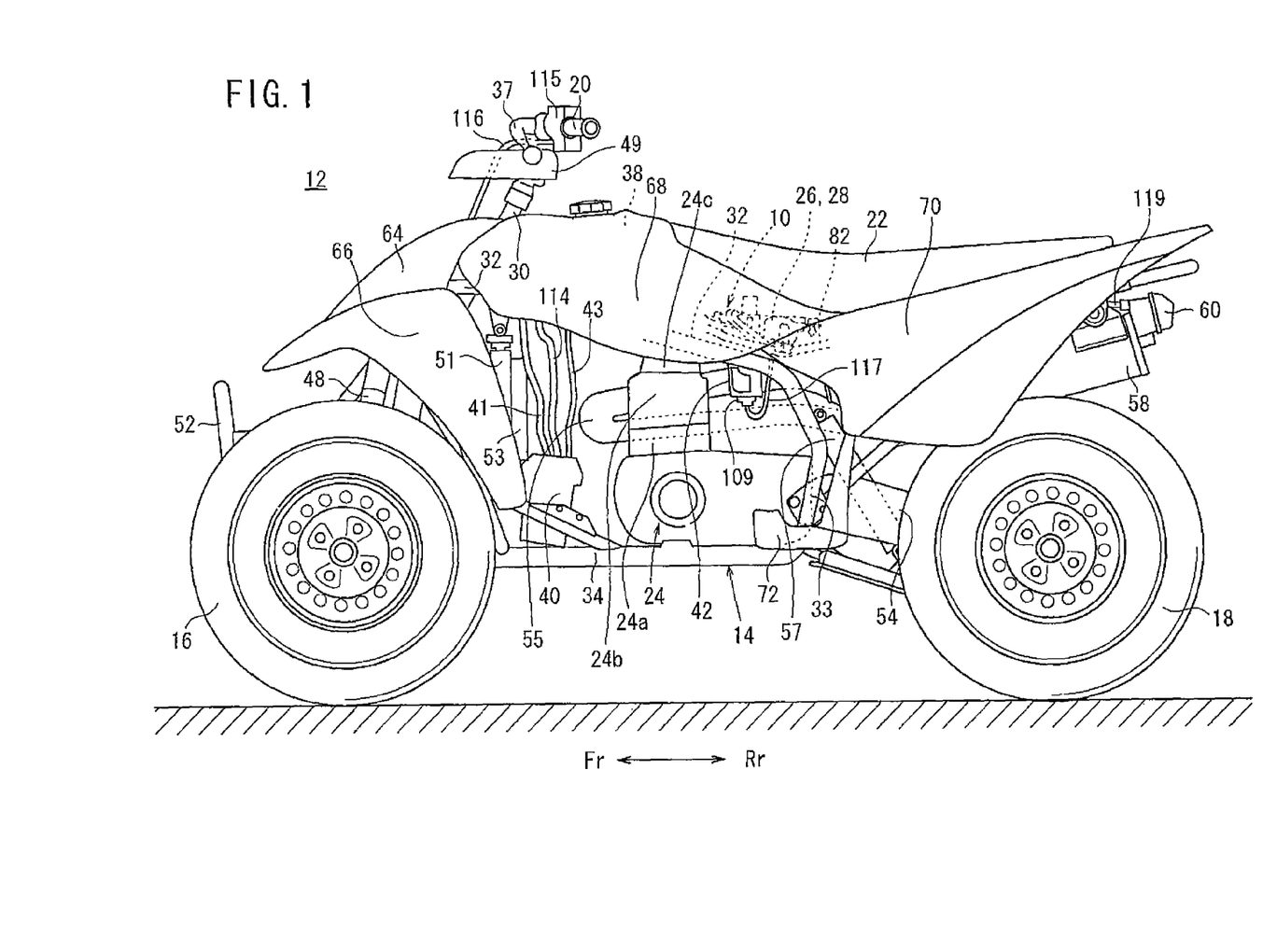
FIG. 1 is a side elevational view showing an ATV as a saddle-riding type vehicle in which an arrangement of an electric part according to an embodiment of the present invention is incorporated.
Figure 2:
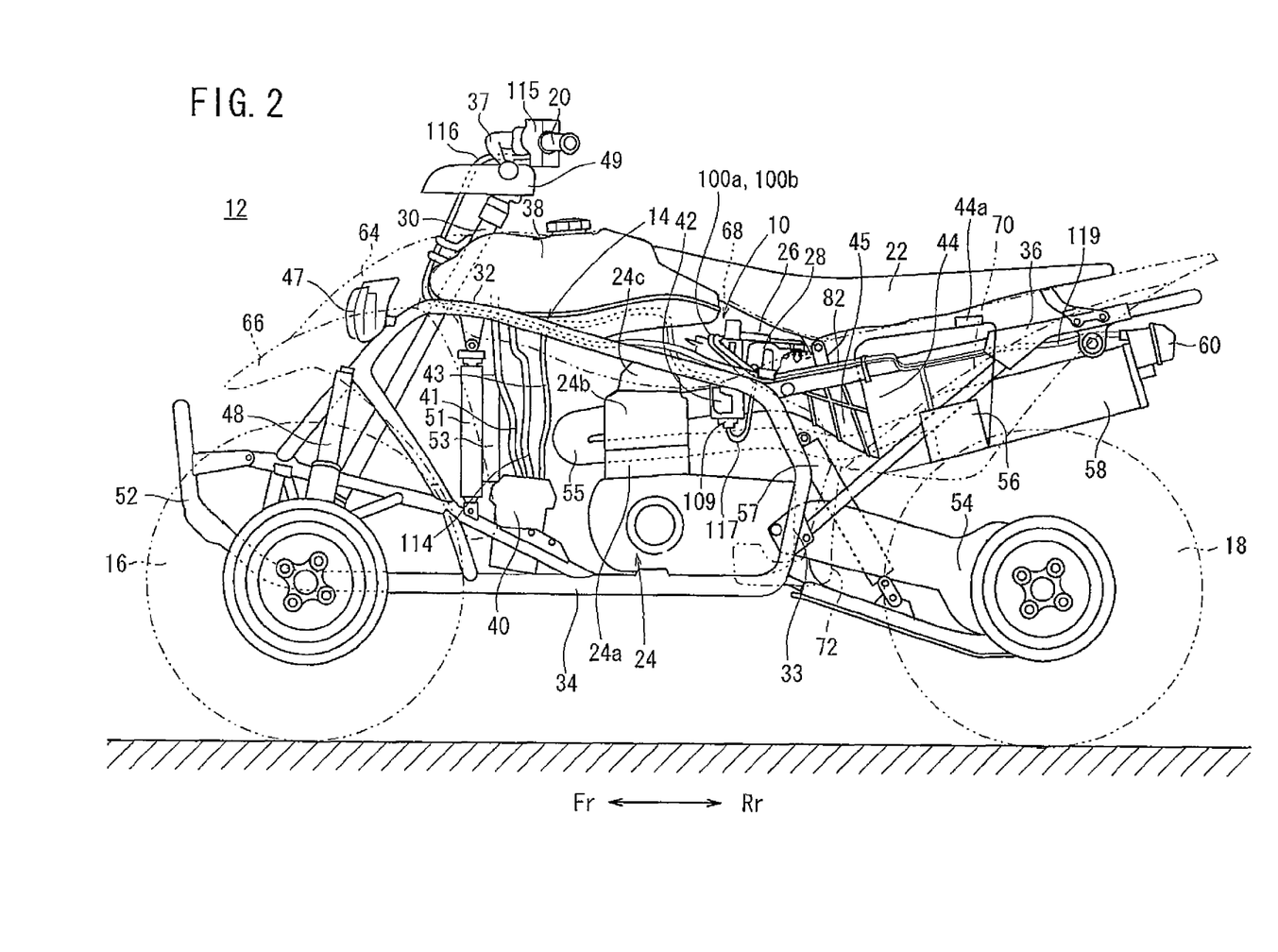
FIG. 2 is a partially omitted side elevational view showing the ATV shown in FIG. 1 with vehicle body covers and other parts removed.

FIG. 1 is a side elevational view showing an ATV 12 as the saddle-riding type vehicle in which an arrangement 10 of an electric part according to an embodiment of the present invention (hereinafter also referred to as "arrangement 10") is incorporated. FIG. 2 is a partial side elevational view showing a condition in which vehicle body covers and other parts are removed from the ATV 12 shown in FIG. 1. In this embodiment of the present invention, an example to which the present invention is applied will be described using an arrangement of a control or ECU in the ATV 12. The present invention is not, however, limited to the specific configuration of the embodiment. Rather, an arrangement of an electric part including at least the ECU can be applied to saddle-riding type vehicles of various types (including, for example, an on-road type, an off-road type, and a scooter type). For an easier understanding, each drawing will be described by appending a letter "L" to an arrow indicating the left of a vehicle body, a letter "R" to an arrow indicating the right of the vehicle body, a letter "Fr" to an arrow indicating the forward direction of the vehicle body, and a letter "Rr" to an arrow indicating the rearward direction of the vehicle body, respectively, according to a viewing direction of a rider sitting in the vehicle.

Referring to the examples of FIGS. 1 and 2, the ATV 12 is a so-called four-wheel buggy, including a vehicle body frame 14, a pair of left and right front wheels 16 as steered wheels, a pair of left and right rear wheels 18 as drive wheels, a handlebar 20 steering the front wheels 16, a seat 22 on which a rider sits, and an engine 24. The ATV 12 further includes an ECU 26 drivingly controlling the engine 24 or the like. The ECU 26 can be mounted on a vehicle body side via a tray-like support member 28.

The vehicle body frame 14 is structured by, for example, integrally joining a plurality of types of steel stock through such processes as welding. The vehicle body frame 14 includes a head pipe 30, a pair of left and right main frames 32, a pair of left and right pivot frames 33, a pair of left and right under frames 34, and a pair of left and right rear frames 36. More specifically, the head pipe 30 is fixed at a front end portion. The main frames 32 extend rearwardly of the vehicle body and obliquely downwardly from the head pipe 30. The pivot frames 33 extend downwardly from rear portions of the main frames 32. The under frames 34 extend horizontally from lower portions of the pivot frames 33 to the side of the front wheels 16 and constitute with such parts as the main frames 32 a cradle type frame. The rear frames 36 extend rearwardly and upwardly of the vehicle body from the rear portions of the main frames 32 and the pivot frames 33.

Figure 4:
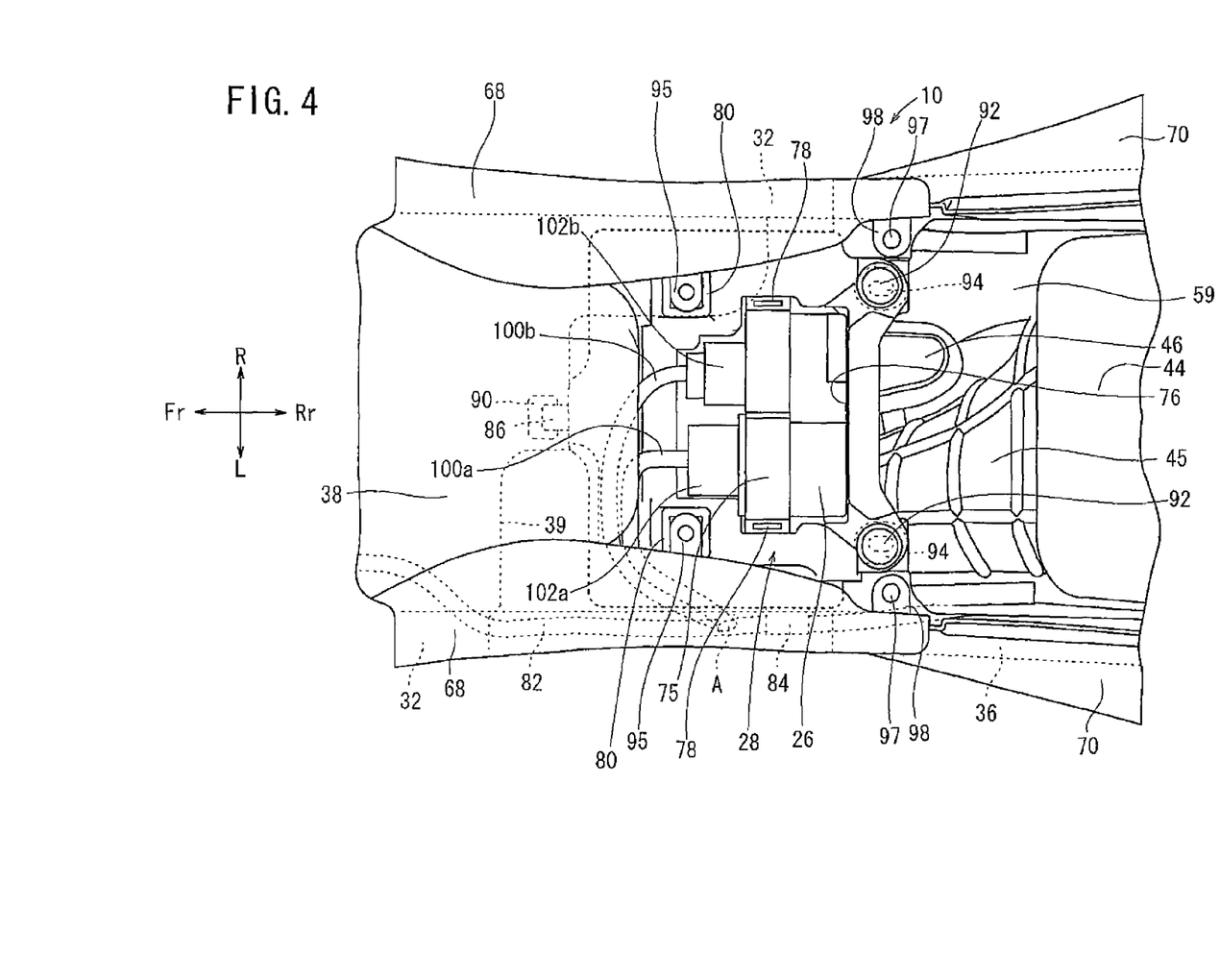
FIG. 4 is a partially omitted plan view of an embodiment of the invention, showing areas around the controller and the support member with a seat removed.

A fuel tank 38 is disposed between the left and right main frames 32 rearwardly of the head pipe 30 that pivots the handlebar 20 on which a hand lever (brake lever) 37 is disposed (see FIGS. 2 and 4). The seat 22 is disposed rearwardly of the fuel tank 38. The engine 24 and a fuel pump 40 are disposed downwardly of the fuel tank 38. The engine 24 includes a cylinder 24a, a cylinder head 24b, and a cylinder head cover 24c. The fuel pump 40 supplies the engine 24 with fuel retained in the fuel tank 38. A heat guard 39 is placed on the lower surface side of the fuel tank 38 (see FIG. 6). The heat guard 39 blocks off exhaust heat from the engine 24. The fuel in the fuel tank 38 is supplied to the fuel pump 40 via a fuel hose 41 and to an injector 107 (see FIG. 6) via a fuel hose 43.

Referring to the examples of FIGS. 2 and 4, a throttle body 42, an air cleaner 44, and an air chamber 46 as intake system parts connected to the intake side of the engine 24 are disposed in an area on the rearward side of the engine 24. The air cleaner 44, which draws air through an intake port 44a oriented upwardly at a lower portion rearward of the seat 22, supplies the air to the throttle body 42 via a connecting tube 45.

On the vehicle body front portion side, the head pipe 30 pivots the handlebar 20 and the handlebar 20 is mounted with a meter 49. The main frame 32 is mounted with a headlight 47 disposed at the front end side thereof (see FIG. 2). A front suspension 48 supporting the front wheel 16 is disposed at the left and right downwardly of the headlight 47. Further, a front guide pipe 52 is disposed on the forward side of the front suspension 48. A radiator 51 and a radiator fan 53 are disposed in juxtaposition with each other in the vehicle body longitudinal direction in a space surrounded by lower portions of the main frames 32 at the front end side thereof.

On the vehicle body rear portion side, a swing arm 54 that journals the rear wheel 18 extends from the rear end side of the pivot frame 33. A rear cushion 57 fixed to the swing arm 54 and the pivot frame 33 is disposed on the inside of the swing arm 54. A battery 56 is mounted at a substantially intermediate lower portion of the rear frame 36. A muffler 58 connected to an exhaust pipe 55 extending from an exhaust side of the cylinder head 24b to the right side surface of the vehicle body and a muffler guard 59 (see FIG. 4) covering part of the muffler 58 are disposed on a side portion of the rear frame 36. In addition, a tail light 60 is disposed on the rear end side of the rear frame 36.

Embodiments of ATV 12 can be provided with various types of vehicle covers covering the outer surface of the vehicle body. Referring to FIG. 1, the ATV 12 is mounted with a front cover 64, a pair of left and right front fenders 66, a pair of left and right side covers 68, a pair of left and right rear fenders (rear covers) 70, and steps 72. Specifically, the front cover 64 covers an area around the headlight 47 (see FIG. 2). The front fenders 66 disposed on either side of the front cover 64 cover the front wheels 16 from an upward direction. The side covers 68 cover an area from both sides of the fuel tank 38 to a front portion downward of the seat 22. The rear fenders (rear covers) 70 cover an area from a downward portion of the seat 22 to an upward portion of the rear wheels 18 on the vehicle body rearward side. The steps 72 provide a rest on which the rider sitting on the seat 22 can rest his or her feet. These vehicle body covers are formed mainly from, for example, a synthetic resin.

The arrangement 10 of the electric part according to embodiments of the present invention incorporated in the ATV 12 as basically arranged as described above will be described below. The arrangement 10 according to the embodiment of the present invention is a structure that allows the ECU 26 as the electric part to be disposed at a predetermined position.

Figure 3:
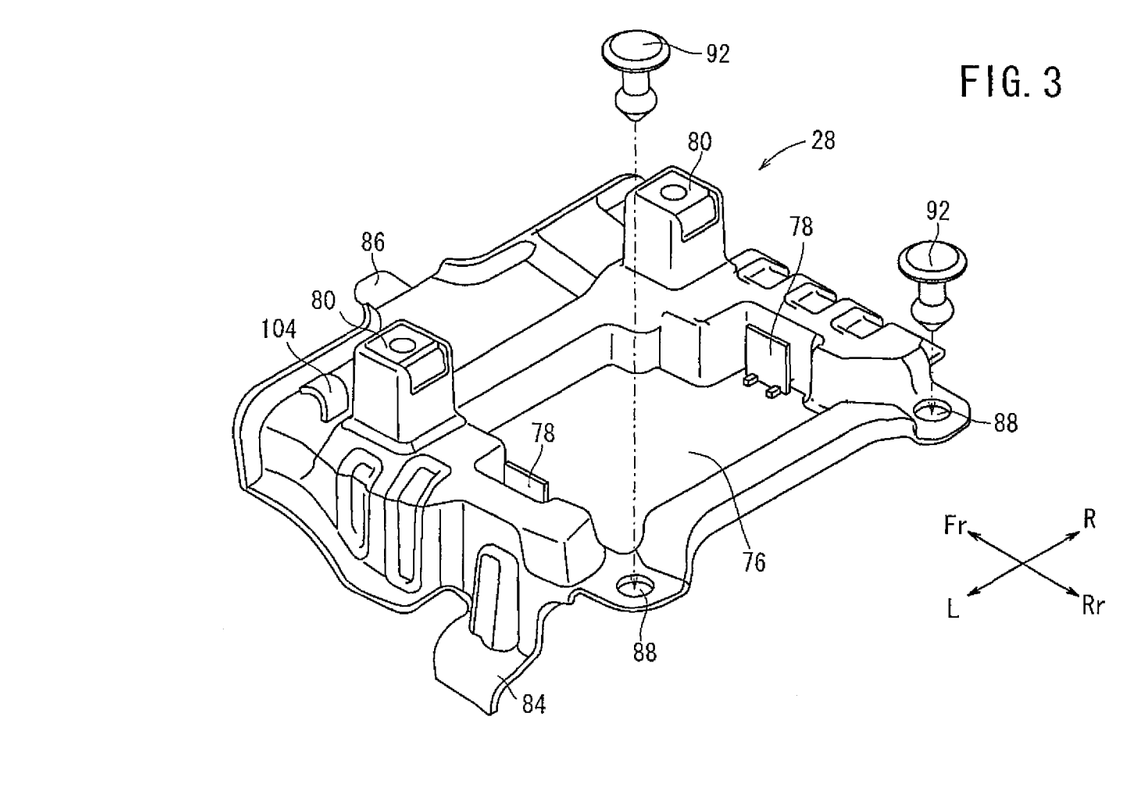
FIG. 3 is a perspective view showing a support member supporting a controller or device such as a ECU according to an embodiment of the invention.

Referring to the example of FIG. 3, the support member 28 is a tray-like member formed from, for example, a synthetic resin. The support member 28 includes a recessed electric part disposition portion 76 formed on an upper surface thereof, with which the ECU 26 having a substantially rectangular shape can be supported.

The support member 28 includes fixing portions 78, a pair of left and right columnar side cover mounting portions 80, a lock portion 84, an engagement tab 86, and a pair of fit-in holes 88. Specifically, the fixing portions 78 are used to mount a rubber band 75 (see FIG. 4) that fixes in place the ECU 26 disposed in the electric part disposition portion 76 by pressing the ECU 26 from the above. The side cover mounting portions 80 protrude upwardly from either side on the forward side. The lock portion 84, having a circularly arcuate leading end, protrudes downwardly from one side (in this example the left side) on the rearward side. The engagement tab 86 protrudes forwardly from a center of the front end portion. The fit-in holes 88 are disposed at left and right corners on the rearward side. More specifically, the fixing portions 78 are substantially planar members protruding on both sides of the electric part disposition portion 76. The lock portion 84 locks in position a main harness (a second harness) 82 (see FIG. 2) extending from the battery 56 to the vehicle body forward side along the main frame 32 by pressing the main harness 82 from the above (see FIGS. 5 and 7). The main harness 82 is fixed as appropriately to, for example, the main frame 32 by, for example, a cable tie 77 or a harness clamp 79 (see FIG. 7).

Referring to FIGS. 4 through 7, the support member 28 is removably mounted on the vehicle body. Specifically, the engagement tab 86 at the front end portion is inserted in, and engaged with, an engagement hole 90 formed at a rear portion of the heat guard 39 disposed at the lower portion of the fuel tank 38. Further, pins (fit members) 92 inserted in the respective fit-in holes 88 are fitted in respective fit portions 94 formed on the front end portion upwardly of the left and right rear fenders 70. The arrangement 10 allows the support member 28 to be easily removed and reinstalled relative to the vehicle body side, so that the ECU 26 supported on the support member 28 can be easily removed and reinstalled relative to the vehicle body.

Referring to the example of FIG. 4, first fastening portions 95 formed on the rear end side upwardly of the left and right side covers 68 can be bolted to the side cover mounting portions 80 of the support member 28 mounted on the vehicle body. In addition, referring to FIGS. 4 and 6, second fastening portions 98 formed at the rear end portions of the left and right side covers 68 are superposed on fastening portions 96 formed outside the fit portions 94 of the left and right rear fenders 70 and jointly fastened to the rear frames 36 by bolts 97. This results in the rear fenders 70 and the side covers 68 being fastened relative to the rear frames 36 and the side cover 68 being also fastened relative to the support member 28.

On the other hand, the ECU 26 can be a control unit that performs an ignition timing control for an ignition coil 106 (see FIG. 6), a fuel injection control for the injector 107 (see FIG. 6), and other controls for, for example, an idle air control valve 108. The ECU 26 also receives inputs of detection values from various types of sensors including a throttle opening sensor 109 (see FIG. 7), an atmospheric pressure sensor, a vacuum sensor, a crank angle sensor, and a coolant temperature sensor not shown.

Figure 5:
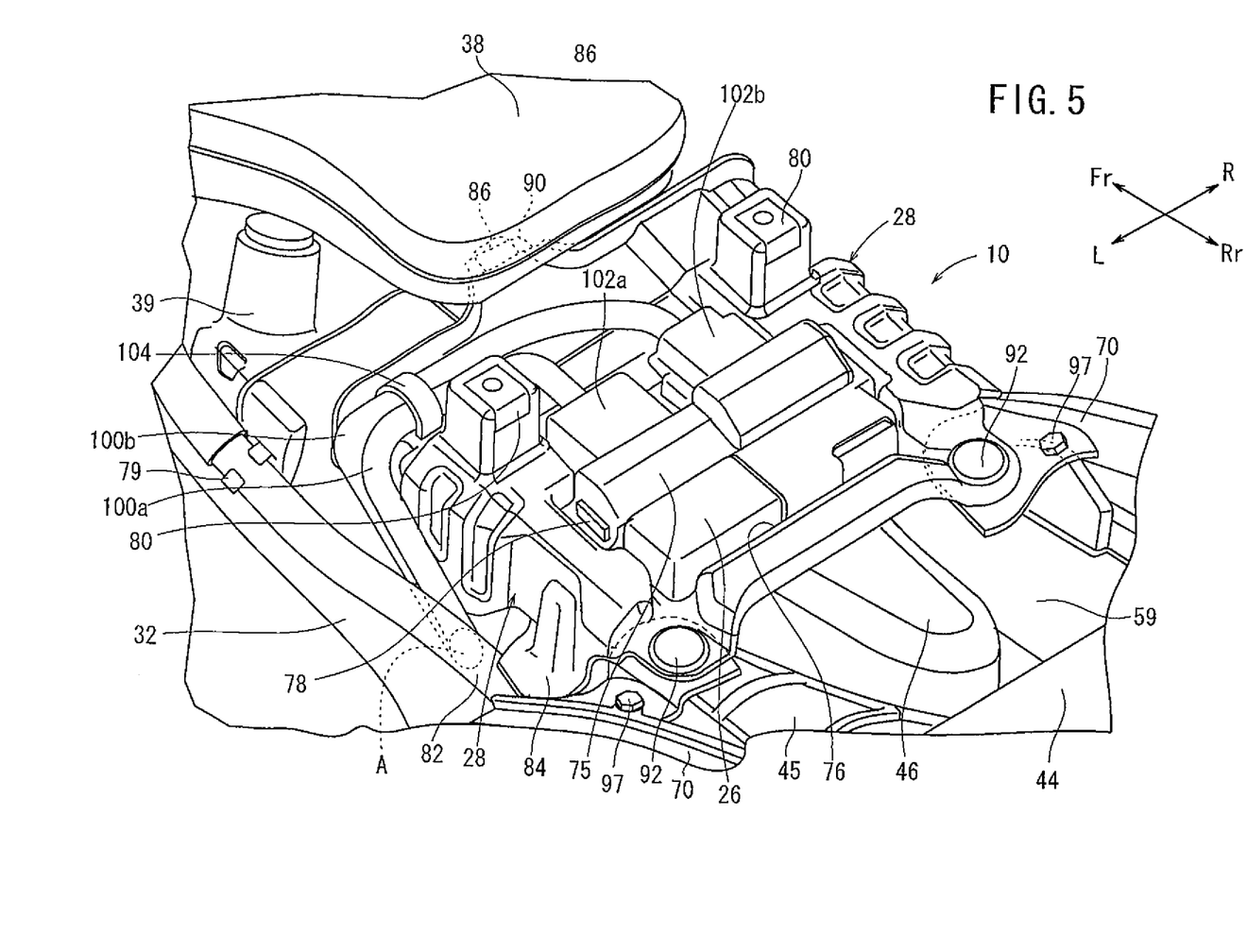
FIG. 5 is a partial perspective view of an embodiment of the invention, showing areas around the controller and the support member with the seat and a side cover removed.

Referring to FIG. 5, with the arrangement 10, two sub-harnesses or first harnesses 100a, 100b branching at a connection A from the main harness 82 are connected to a first surface side or front surface side of the ECU 26 with connector terminals 102a, 102b. At this time, the sub-harnesses 100a, 100b are reliably fixed to the support member 28 using a lock pawl or lock means 104 disposed on the support member 28. The lock pawl 104 may be a clip or the like.

Figure 6:
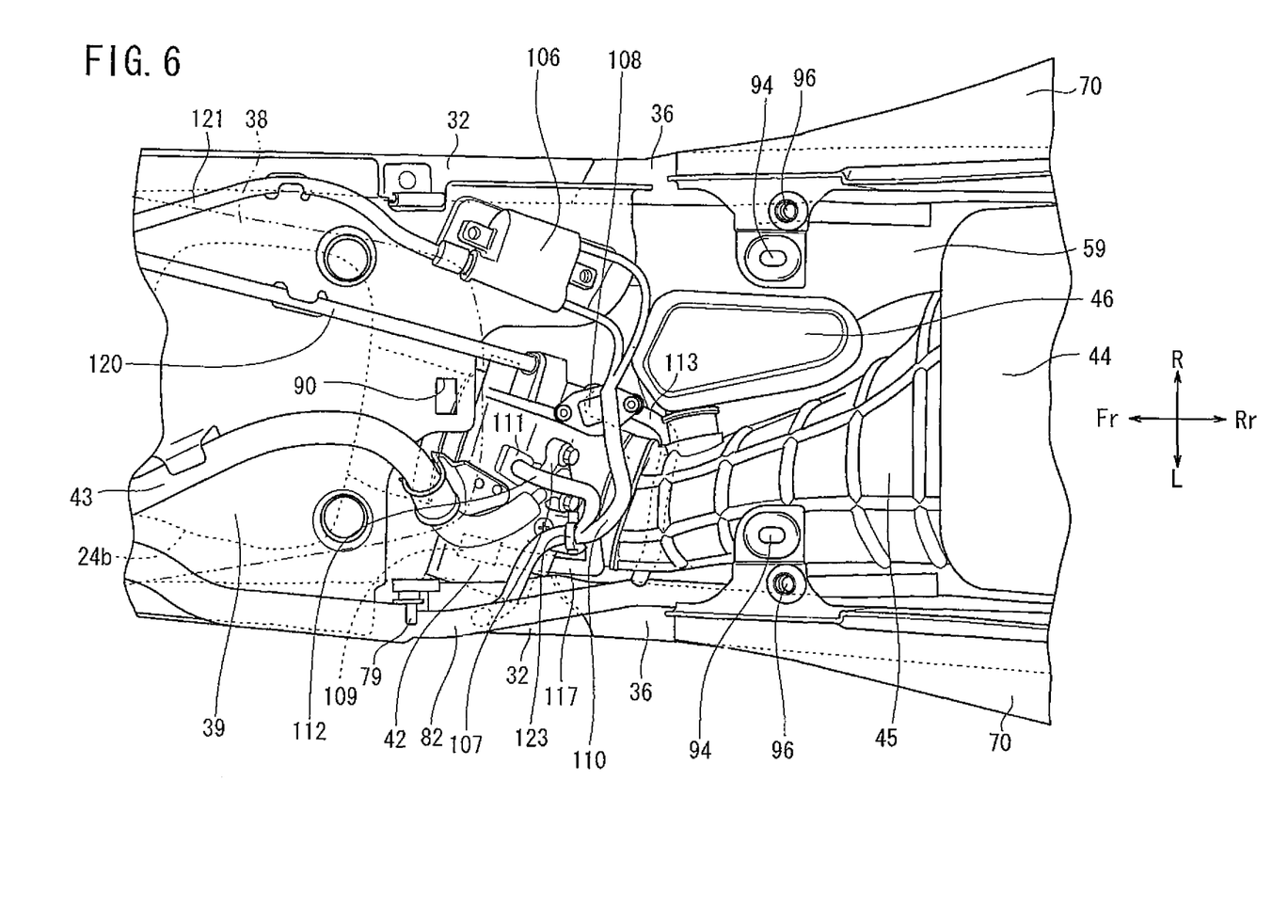
FIG. 6 is a partial plan view of an embodiment of the invention, showing a throttle body and areas therearound with the seat, the side cover, the support member, and a fuel tank removed.

A number of sub-harnesses can be electrically connected to the ECU 26 via the sub-harnesses 100a, 100b and the main harness 82. Specifically, for example, a sub-harness 110 connected to the ignition coil 106 (see FIG. 6), a sub-harness 112 connected to a power supply connector 111 of the injector 107 (see FIG. 6), a sub-harness 113 routed downwardly of the connecting tube 45 of the air cleaner 44 and connected to the idle air control valve 108 (see FIG. 6), a sub-harness 117 connected to the throttle opening sensor 109 (see FIG. 7), a sub-harness 114 connected to the fuel pump 40 (see FIG. 2), a sub-harness 116 connected to a handlebar switch 115 disposed on the handlebar 20 (see FIG. 2), and a sub-harness 119 connected to the tail light 60. The abovementioned sub-harnesses are also electrically connected to the battery 56 via, for example, the main harness 82. In FIG. 6, reference numeral 121 denotes a cable connecting the ignition coil 106 and an ignition plug (not shown) and reference numeral 123 denotes a harness clamp fixing, for example, the sub-harnesses 110, 112.

Effects of the arrangement 10 as basically arranged as described above will now be described below.

As described above, the ECU 26 is electrically connected to the parts to be controlled via the harnesses and many of the parts to be controlled are concentrated in the area near the engine 24. With the throttle body 42 and other intake system parts, in particular, sensors of various sorts tend to be centralized for the control. To shorten the length of the sub-harnesses 100a, 100b branching from the main harness 82 and connected to the ECU 26 as much as possible for reduction in weight, therefore, it is desirable that the ECU 26 be disposed near the intake system parts or the engine 24.

Figure 7:
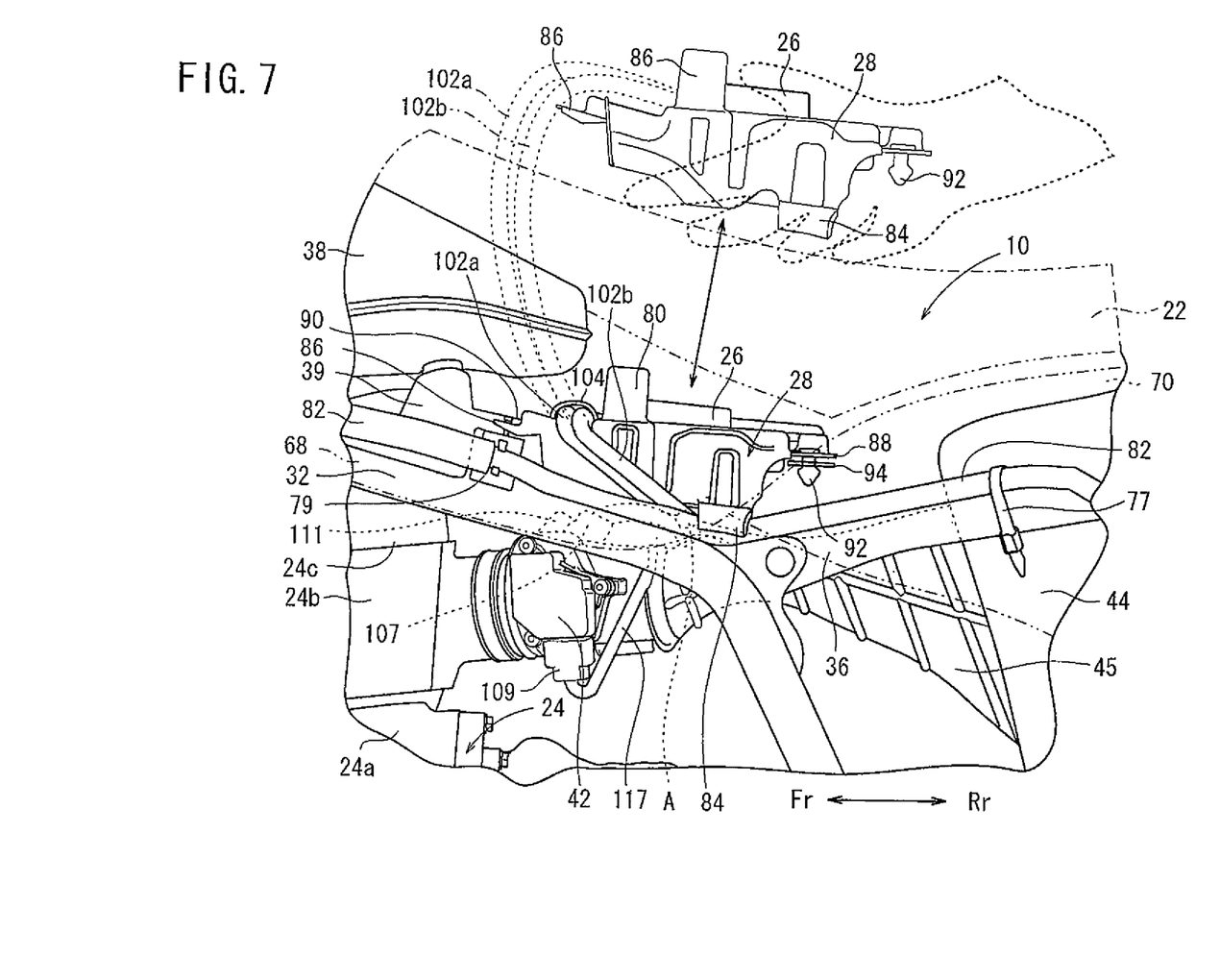
FIG. 7 is a side elevational view of an embodiment of the invention showing the areas around the controller and the support member with the seat and the side cover removed.

In the arrangement 10 according to this embodiment, therefore, as shown in FIG. 7, the support member 28 supporting the ECU 26 is disposed upwardly of the throttle body 42, downwardly of the seat 22, and rearwardly of the fuel tank 38. As is understood from, for example, FIG. 2 and it is common with the ATV that other intake system parts (such as the air cleaner 44) and auxiliaries of various types are concentrated in areas near the engine 24 and the throttle body 42. This is because there is a relatively ample space available in a space above the throttle body 42.

The throttle body 42 requires predetermined or periodic servicing, including, for example, replacement of a throttle cable 120 (see FIG. 6) for opening or closing a throttle valve (not shown) using an accelerator (not shown) on the side of the handlebar 20. In vehicles such as the ATV 12, used in environment in which the vehicle tend to be dirtied by, for example, muddy water or dirt, in particular, the throttle cable 120 can have a tendency to corrode or wear compared with, for example, ordinary motorcycles, resulting in greater frequency of servicing. In this case, in a vehicle such as the ATV 12, the main frames 32, the exhaust pipe 55, and the vehicle body covers (the side covers 68 and the rear fenders 70) can be disposed sideways of the vehicle body. This makes it difficult to access and service the throttle body 42 from a side and the service job is generally performed as accessed from above.

In other words, it is not desirable to dispose the ECU 26 upwardly of the throttle body 42 as in the arrangement 10 and it is desirable that a space for servicing be obtained above the throttle body 42. Assume that the ECU 26 is fixed above the throttle body 42 relative to the vehicle body frame 14 using a process, for example, bolting. Then, when servicing the throttle body 42, the ECU 26 needs to be removed and reinstalled. Troublesome procedures are involved in connecting and routing the harnesses connected to the ECU 26. Specifically, simply disposing the ECU 26 above the throttle body 42 impairs maintainability of the throttle body 42.

In contrast, in the arrangement 10 according to embodiments of the present invention, the ECU 26 is supported on the support member 28, which allows the ECU 26 to be easily removed or reinstalled relative to the vehicle body. As a result, when the throttle body 42 needs to be serviced, simply removing the support member 28 gains easy access to the throttle body 42.

To remove the support member 28 from the vehicle body, the seat 22 is first removed, which exposes the ECU 26 supported on the support member 28 (see FIG. 4). Then, the side covers 68 are removed. Specifically, fastening of the second fastening portions 98 to the rear frames 36 is disengaged and fastening of the first fastening portions 95 to the side cover mounting portions 80 of the support member 28 is disengaged before the side covers are removed, as illustrated, for example, in FIG. 5.

Figure 8:
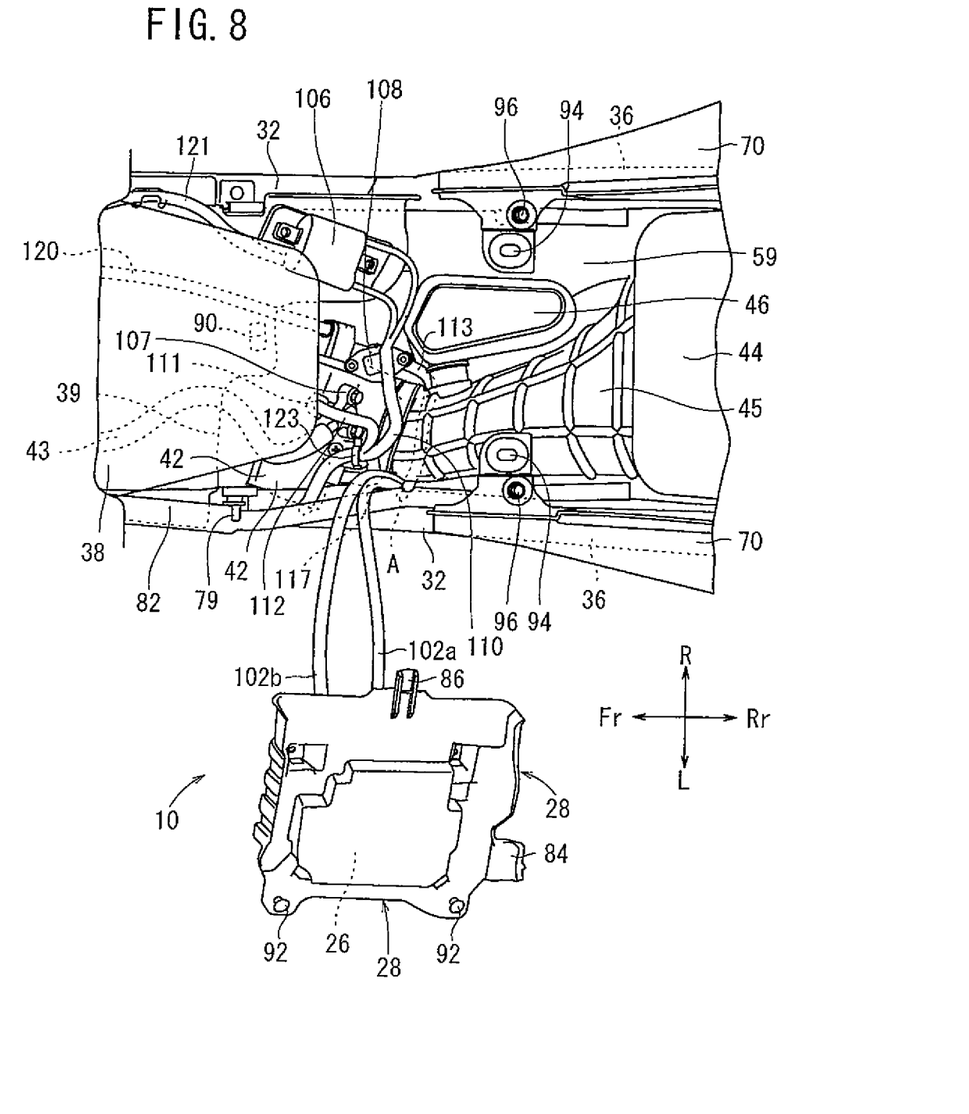
FIG. 8 is a partial plan view of an embodiment of the invention, showing a condition in which the ECU is removed from a vehicle body as a result of the support member being removed from the vehicle body.

Referring to FIGS. 7 and 8, the ECU 26 can then be easily removed with the support member 28 from the vehicle body by simply pulling out the pins 92 from the fit portions 94 of the rear fenders 70 and pulling out the engagement tab 86 from the engagement hole 90 in the heat guard 39.

Referring to FIG. 8, the ECU 26 and the support member 28 that supports the ECU 26 can thus be easily removed or moved with the connection A as the branch point of the sub-harnesses 100a, 100b connected to the ECU 26 from the main harness 82 as a pivot and with the sub-harnesses 100a, 100b as a hinge, so that the ECU 26 and the support member 28 can be retained, for example, on one side of the vehicle body where the ECU 26 and the support member 28 lie in the way of servicing the throttle body 42. Moreover, the support member 28 can include the lock pawl 104 that locks in place the sub-harnesses 100a, 100b (see FIG. 5). When the support member 28 is removed or reinstalled relative to the vehicle body or when the support member 28 which has been removed from the vehicle body is to be retained on one side of the vehicle, therefore, the connector terminals 102a, 102b on the proximal end side of the sub-harnesses 100a, 100b functioning as the hinge can be effectively prevented from being loaded.

As described above, in the arrangement 10 according to embodiments of the present invention, the ECU 26 is supported by the support member 28 formed separately from the throttle body 42 and the air cleaner 44 disposed rearwardly of the throttle body 42. Further, the support member 28 is disposed upwardly of and near the throttle body 42 that requires periodic servicing jobs and to which a number of various types of sensors controlled by the ECU 26 are connected. This allows the length of the sub-harnesses 100a, 100b connected to the ECU 26 to be minimized, which improves wiring efficiency. Further, the ECU 26 can be easily removed or reinstalled relative to the vehicle body via the support member 28, which achieves good maintainability of the throttle body 42 disposed downwardly of the support member 28.

In accordance with the arrangement 10 of certain embodiments of the present invention, the electric part including the ECU 26 can be disposed at any position including the upward space which conventionally needs to be obtained as a service space for the throttle body 42, so that the space can be effectively and efficiently used.

In this case, the ECU 26 can be disposed in a space surrounded by the seat 22, the fuel tank 38, and the support member 28, which effectively inhibits extraneous influence, such as muddy water, on the ECU 26. In addition, the ECU 26 or other electric part can be disposed near a center of gravity of the vehicle, which is preferable in terms, for example, of vehicle balance. Moreover, the support member 28 is disposed across the left and right main frames 32. This allows the electric part to be disposed near a center in the vehicle width, achieving good weight balance in the lateral direction of the vehicle. Additionally, the ECU 26, though disposed upwardly of the engine 24 and the like, has the lower surface side thereof covered with the support member 28. This effectively blocks off the effect of exhaust heat from the engine 24 and the like on the ECU 26. Specifically, the support member 28 functions also as a heat guard for the ECU 26.

The support member 28 supporting the ECU 26 is fitted to the vehicle body side using the pins 92 and the engagement tab 86 without using a bolt or other fastening member, which permits simplified removal of the support member 28. In addition, the support member 28 can be mounted across the left and right rear fenders 70. This results in the support member 28 connecting and reinforcing between the left and right rear fenders 70. To state the foregoing another way, the support member 28 can be made to function as a reinforcement member for the rear fenders 70. Similarly, the support member 28 includes the side cover mounting portions 80 for attaching the side covers 68. This results also in the support member 28 connecting and reinforcing between the left and right side covers 68. The reinforcement effect by the support member 28 therefore effectively prevents, for example, play from being produced in the side covers 68 or the rear fenders 70 and the side covers 68 or the rear fenders 70 from widening in the vehicle width direction. Particularly noteworthy is an effect of preventing oscillation or vibration which the ATV 12 can develop while operating.

As illustrated in FIGS. 7 and 8, in embodiments of arrangement 10, the sub-harnesses 100a, 100b extending from the ECU 26 supported on the support member 28 are routed toward only one side, such as the left side of the vehicle and connected to the main harness 82. In other words, the support member 28 is connected to the vehicle body side by the sub-harnesses 100a, 100b in a condition of being movable in a predetermined direction. Accordingly, as compared, for example, with a structure in which harnesses extend from the left and right sides of the support member 28, the arrangement 10 can keep minimum a harness length required for removing and moving the support member 28. This can improve workability involved in removing and reinstalling the support member 28. In addition, the sub-harnesses 100a, 100b themselves can also be easily routed and the support member 28 can be even more easily moved to one side of the vehicle, which creates a wide work space in the space from which the support member 28 is removed.

During removal and reinstallation of the support member 28 before and after the servicing of the throttle body 42, there is no need to connect the sub-harnesses to the ECU 26 and the sub-harnesses 100a, 100b can be easily brought back into the original positions. Specifically, embodiments of the present invention can achieve an optimum arrangement that requires a minimum length of, for example, harnesses, while ensuring good maintainability of the throttle body 42 as a part requiring the predetermined service jobs.

It will be understood by those skilled in the art that the present invention is not limited to the above-described embodiment and various changes in form or process may be made therein without departing from the spirit and scope of the invention.

For example, only the ECU is exemplified as the electric part in the above-described embodiment; nonetheless, the electric part to be disposed in the arrangement of the embodiment of the present invention may be supported on the support member together with another electric part (for example, relay) as long as the electric part includes at least an ECU.

DESCRIPTION OF REFERENCE SYMBOLS

10: Arrangement of electric part
12: ATV
14: Vehicle body frame
24: Engine
26: ECU
28: Support member
32: Main frame
38: Fuel tank
42: Throttle body
68: Side cover
70: Rear fender
82: Main harness
86: Engagement tab
88: Fit-in hole
90: Engagement hole
92: Pin
94: Fit portion
95: First fastening portion
96: Fastening portion
98: Second fastening portion
100a, 100b, 110, 112, 113, 114, 116, 117, 119: Sub-harness
104: Lock pawl

We claim:

1. A saddle-ride type vehicle, comprising:
a vehicle frame including a left main frame and a right main frame extending from a forward side to a rearward side of a vehicle body;
an engine supported on the vehicle frame;
a throttle body disposed near the engine;
an air cleaner disposed adjacent the throttle body;
a controller configured to control the engine; and
a support member supporting at least the controller, the support member being removeably mounted relative to the vehicle body, the support member being separate from the throttle body and the air cleaner,
wherein the support member is disposed above the throttle body,
wherein the support member comprises a recessed portion formed on an upper surface thereof,
wherein the controller is configured to be mounted in the recessed portion, and
wherein the recessed portion is configured to surround the controller when mounted.

2. The vehicle according claim 1, wherein the support member is configured to be removable relative to the vehicle body by having at least one fit element which engages at least one fit portion on a side of the vehicle body.

3. The vehicle according to claim 1, further comprising:
a fuel tank disposed between the left main frame and the right main frame; and
a seat configured to support an occupant, said seat being disposed rearwardly of the fuel tank,
wherein the support member is disposed rearwardly of the fuel tank and below the seat, and adjacent thereto.

4. The vehicle according to claim 3, further comprising:
at least one rear fender disposed on a lateral side of the vehicle body, the at least one rear fender covering from an area downward of the seat to a rearward side of the vehicle body,
wherein the support member is disposed as a reinforcement member with respect to the at least one rear fender.

5. The vehicle according to claim 4, comprising at least two rear fenders, and wherein the support member is disposed as a reinforcement member with respect to the at least two rear fenders.

6. The vehicle according to claim 1, further comprising:
at least one side cover disposed on at least one lateral side of the vehicle body, the at least one side cover covering areas from side portions of a fuel tank to a front portion below the seat,
wherein the support member is removeably mounted relative to the vehicle body, with at least one side cover and the seat removed.

7. The vehicle according to claim 6, comprising at least two side covers, each of said at least two side covers disposed on each lateral side of the vehicle body.

8. The vehicle according to claim 1, wherein the support member is disposed as a reinforcement member with respect to the left and right main frames.

9. A saddle-ride type vehicle, comprising:
a vehicle frame including a left main frame and a right main frame extending from a forward side to a rearward side of a vehicle body;
an engine supported on the vehicle frame;
a throttle body disposed near the engine;
an air cleaner disposed adjacent the throttle body;
a controller configured to control the engine;
a support member supporting at least the controller, the support member being removeably mounted relative to the vehicle body, the support member being separate from the throttle body and the air cleaner; and
a first harness extending from the controller, the first harness being configured to be connected by a lock device disposed on the support member to a second harness fixed to at least one of the main frames,
wherein the support member is disposed above the throttle body,
wherein the support member comprises a recessed portion formed on an upper surface thereof,
wherein the controller is configured to be mounted in the recessed portion,
wherein the recessed portion is configured to surround the controller when mounted, and
wherein the support member is moveable about a connection between the first harness and the second harness, in a pivotable manner.

10. The vehicle according to claim 9, wherein the first harness is configured to be routed toward one side of the vehicle body before being connected to the second harness.

11. A saddle-type riding vehicle, comprising:
body frame means for supporting vehicle components thereupon, said vehicle frame means extending from a forward side to a rearward side of a vehicle body;
drive means for providing drive power to the vehicle, said drive means supported on the body frame means;
throttle body means for controlling intake air to the drive means, said throttle body means being disposed near the drive means;
air cleaner means for cleaning said intake air, said air cleaner means disposed rearwardly of the throttle body means;
control means for controlling the engine;
support means for supporting an electric part including at least the control means, support means being removeably mounted relative to a vehicle body and formed separately from the throttle body means and the air cleaner means,
wherein the support means is disposed above and adjacent the throttle body means,
wherein the support means comprises a recessed portion formed on an upper surface thereof,
wherein the control means is configured to be mounted in the recessed portion, and
wherein the recessed portion is configured to surround the control means when mounted.

12. The vehicle according to claim 11, wherein the support means is removable relative to the vehicle body, said support means being removable by fitting means on the support means and on a side of the vehicle body.

13. The vehicle according to claim 11, further comprising:
fuel storage means supported between elements of the body frame means; and
seating means for supporting an occupant, said seating means being disposed rearwardly of the fuel storage means, wherein the support means is disposed rearwardly of the fuel storage means and below the seating means, an adjacent to the fuel storage means and the seating means.

14. The vehicle according to claim 13, the vehicle further comprising:
cover means disposed on a lateral side of the vehicle body, said cover means for covering areas from side portions of the fuel storage means to a front portion below the seating means, wherein the support means is removably mounted relative to the vehicle body with the cover means and the seating means removed.

15. The vehicle according to claim 13, further comprising:
rear fender means disposed on lateral sides of the vehicle body, the rear fender means for covering from an area downward of the seating means to a rearward side of the vehicle body, wherein the support means is disposed as a reinforcement member with respect to the rear fender means.

16. The vehicle according to claim 13, wherein the seating means is disposed as a reinforcement member with respect to sides of the vehicle frame means.

17. A saddle-type riding vehicle, comprising:
body frame means for supporting vehicle components thereupon, said vehicle frame means extending from a forward side to a rearward side of a vehicle body;
drive means for providing drive power to the vehicle, said drive means supported on the body frame means;
throttle body means for controlling intake air to the drive means, said throttle body means being disposed near the drive means;
air cleaner means for cleaning said intake air, said air cleaner means disposed rearwardly of the throttle body means;
control means for controlling the engine;
support means for supporting an electric part including at least the control means, support means being removeably mounted relative to a vehicle body and formed separately from the throttle body means and the air cleaner means;
fuel storage means supported between elements of the body frame means;
seating means for supporting an occupant, said seating means being disposed rearwardly of the fuel storage means, in the support means is disposed rearwardly of the fuel storage means and below the seating means, an adjacent to the fuel storage means and the seating means; and first harness means for making electrical connections on the vehicle body, said first harness means extending from the control means supported on the support means, said first harness means being connected to a second harness means fixed to the vehicle frame means, said first harness means and the second harness means being connected together by a lock means for securely engaging the connection, wherein the support means is pivotally movable about a connection between the first harness means and the second harness means, wherein the support means is disposed above and adjacent the throttle body means, wherein the support means comprises a recessed portion formed on an upper surface thereof, wherein the control means is configured to be mounted in the recessed portion., and wherein the recessed portion is configured to surround the control means when mounted.

18. A vehicle according to claim 17, wherein the first harness means is routed toward one side of the vehicle body before being connected to the second harness means.

* * * * *